United States Patent
Vander Lind et al.

(10) Patent No.: US 9,879,655 B1
(45) Date of Patent: Jan. 30, 2018

(54) ATTACHMENT APPARATUS FOR AN AERIAL VEHICLE

(71) Applicant: X Development LLC, Mountain View, CA (US)

(72) Inventors: Damon Vander Lind, Alameda, CA (US); Gregor Cadman, Mountain View, CA (US)

(73) Assignee: X Development LLC, Mountain View, CA (US)

(*) Notice: Subject to any disclaimer, the term of this patent is extended or adjusted under 35 U.S.C. 154(b) by 476 days.

(21) Appl. No.: 14/587,279

(22) Filed: Dec. 31, 2014

Related U.S. Application Data

(60) Provisional application No. 62/018,942, filed on Jun. 30, 2014.

(51) Int. Cl.
| | |
|---|---|
| *B64C 31/06* | (2006.01) |
| *F03D 9/32* | (2016.01) |
| *B64C 39/02* | (2006.01) |
| *B64F 3/02* | (2006.01) |
| *F03D 1/06* | (2006.01) |
| *F03D 7/02* | (2006.01) |
| *F03D 9/00* | (2016.01) |
| *B64C 1/26* | (2006.01) |

(52) U.S. Cl.
CPC .................. *F03D 9/32* (2016.05); *B64C 1/26* (2013.01); *B64C 39/022* (2013.01); *B64F 3/02* (2013.01); *F03D 1/0666* (2013.01); *F03D 7/026* (2013.01); *F03D 9/002* (2013.01)

(58) Field of Classification Search
CPC ..... F03D 9/32; F03D 5/00; F03D 7/00; F03D 1/0666; F03D 5/02; B64C 7/00; B64C 39/022; B64C 3/20; B64C 1/26; B64C 31/06; B64D 27/26; B64F 3/02
See application file for complete search history.

(56) References Cited

U.S. PATENT DOCUMENTS

| | | | | |
|---|---|---|---|---|
| 3,335,977 | A * | 8/1967 | Meditz ...................... | B64C 3/42 244/12.4 |
| 4,915,665 | A * | 4/1990 | Ming ..................... | A63H 27/00 446/34 |
| 5,842,666 | A * | 12/1998 | Gerhardt ................... | B64C 3/10 244/15 |
| 8,800,931 | B2 * | 8/2014 | Vander Lind ........ | A63H 27/002 244/154 |

(Continued)

FOREIGN PATENT DOCUMENTS

NL    WO 2014029477 A1 *  2/2014   ............... F03D 5/00

*Primary Examiner* — Richard G Davis
(74) *Attorney, Agent, or Firm* — McDonnell Boehnen Hulbert & Berghoff LLP

(57) ABSTRACT

An apparatus is provided that includes a top clamshell having a first contoured surface that is configured to capture at least a portion of a top surface of a wing of an airborne wind turbine (AWT). The apparatus further includes a bottom clamshell having a second contoured surface that is configured to capture at least a portion of a bottom surface of the wing. The first contoured surface and the second contoured surface are configured to restrain the wing between the top clamshell and the bottom clamshell. The top clamshell is configured to be coupled to the fuselage attachment via a fastener at an aft end of the attachment apparatus.

20 Claims, 10 Drawing Sheets

(56) References Cited

U.S. PATENT DOCUMENTS

| | | | |
|---|---|---|---|
| 8,955,795 B2* | 2/2015 | Vander Lind | B64C 31/06 244/154 |
| 9,169,013 B2* | 10/2015 | Jensen | B64C 39/022 |
| 9,212,033 B2* | 12/2015 | Vander Lind | B21C 23/00 |
| 9,329,096 B1* | 5/2016 | Jensen | G01L 5/16 |
| 9,352,832 B2* | 5/2016 | Vander Lind | B64C 31/06 |
| 9,353,033 B2* | 5/2016 | Vander Lind | F03D 9/002 |
| 2010/0013236 A1* | 1/2010 | Carroll | B64C 39/022 290/55 |
| 2010/0026007 A1* | 2/2010 | Bevirt | B64C 31/06 290/55 |
| 2010/0221112 A1* | 9/2010 | Bevirt | F03D 5/00 416/135 |
| 2011/0036939 A1* | 2/2011 | Easter | B60F 5/02 244/2 |
| 2011/0117773 A1* | 5/2011 | Delmas | H01R 11/12 439/544 |
| 2011/0121570 A1* | 5/2011 | Bevirt | F03D 5/06 290/44 |
| 2011/0260462 A1* | 10/2011 | Vander Lind | A63H 27/002 290/55 |
| 2011/0266395 A1* | 11/2011 | Bevirt | F03D 5/00 244/155 R |
| 2012/0061525 A1* | 3/2012 | Czech | B64C 9/18 244/215 |
| 2012/0104763 A1* | 5/2012 | Lind | B64C 31/06 290/55 |
| 2012/0298793 A1* | 11/2012 | Weddendorf | F03D 1/02 244/17.23 |
| 2013/0052033 A1 | 2/2013 | Lund et al. | |
| 2013/0206921 A1* | 8/2013 | Paduano | B64D 43/00 244/7 C |
| 2013/0221154 A1* | 8/2013 | Vander Lind | B64C 31/06 244/54 |
| 2013/0257058 A1* | 10/2013 | Wilson | F03B 17/005 290/55 |
| 2015/0028592 A1* | 1/2015 | Ori | F03D 1/025 290/44 |
| 2015/0039161 A1* | 2/2015 | Hastings | A63H 30/02 701/3 |
| 2015/0076284 A1* | 3/2015 | Chubb | B64C 39/022 244/1 TD |
| 2015/0097086 A1* | 4/2015 | Schaefer | B64C 39/022 244/175 |
| 2015/0158585 A1* | 6/2015 | Hachtmann | B64C 39/022 439/18 |
| 2015/0180186 A1* | 6/2015 | Vander Lind | H01R 35/02 290/55 |
| 2015/0180379 A1* | 6/2015 | Goessling | H02P 5/00 290/55 |
| 2015/0183510 A1* | 7/2015 | Vander Lind | B64C 11/343 416/1 |
| 2015/0183515 A1* | 7/2015 | Vander Lind | B64C 39/02 244/13 |
| 2015/0183516 A1* | 7/2015 | Vander Lind | B64C 39/022 244/155 R |
| 2015/0183518 A1* | 7/2015 | Stuckl | B64C 3/10 244/13 |
| 2015/0183527 A1* | 7/2015 | Hachtmann | B64F 1/12 244/110 E |
| 2015/0284104 A1* | 10/2015 | Zhao | B64D 33/02 244/53 B |
| 2015/0300293 A1* | 10/2015 | Suciu | F02C 3/045 60/772 |
| 2015/0344135 A1* | 12/2015 | Alber | B64C 29/02 244/12.4 |
| 2015/0375847 A1* | 12/2015 | Kinne | F03D 5/00 244/48 |
| 2016/0010627 A1* | 1/2016 | Austin | F03D 3/02 290/55 |
| 2016/0013703 A1* | 1/2016 | Marzelius | F03D 5/00 290/43 |
| 2016/0061186 A1* | 3/2016 | Vander Lind | F03D 5/00 416/85 |
| 2016/0115937 A1* | 4/2016 | Pettersson | F03D 11/04 290/43 |
| 2016/0144967 A1* | 5/2016 | Golshany | B64D 27/18 244/54 |
| 2016/0195443 A1* | 7/2016 | Jensen | G01L 5/16 73/862.045 |

* cited by examiner

ATTACHMENT APPARATUS FOR AN AERIAL VEHICLE

CROSS REFERENCE TO RELATED APPLICATION

The present disclosure claims priority to U.S. Provisional Patent Application No. 62/018,942, filed on Jun. 30, 2014, the entire contents of which are herein incorporated by reference.

BACKGROUND

Unless otherwise indicated herein, the materials described in this section are not prior art to the claims in this application and are not admitted to be prior art by inclusion in this section.

Aerial vehicles may be composed of multiple separate components which are attached to each other via various attachment means. Preferably, an attachment means may be a structure that is robust and lightweight in order to allow the aerial vehicle to expend less energy during flight.

SUMMARY

In one example, an apparatus is provided that includes a top clamshell having a first contoured surface that is configured to capture at least a portion of a top surface of a wing of an airborne wind turbine (AWT). The apparatus further includes a bottom clamshell having a second contoured surface that is configured to capture at least a portion of a bottom surface of the wing. The first contoured surface and the second contoured surface are configured to restrain the wing between the top clamshell and the bottom clamshell. The top clamshell is configured to be coupled to the fuselage attachment via a fastener at an aft end of the attachment apparatus.

In another example, an airborne wind turbine is provided that includes a ground station, a tether, and an aerial vehicle. The aerial vehicle is configured to be coupled to the ground station via the tether, and the aerial vehicle includes an attachment apparatus. The attachment apparatus further includes a top clamshell having a first contoured surface that is configured to capture at least a portion of a top surface of a wing of the aerial vehicle. The attachment apparatus also includes a bottom clamshell having a second contoured surface that is configured to capture at least a portion of a bottom surface of the wing. The first contoured surface and the second contoured surface are configured to restrain the wing between the top clamshell and the bottom clamshell. The top clamshell is configured to be coupled to the fuselage attachment via a fastener at an aft end of the attachment apparatus.

In yet another example, an apparatus is provided that includes a top clamshell having a first contoured surface that captures at least a portion of a top surface of a wing of an airborne wind turbine (AWT). The first contoured surface is adhesively coupled to the top surface of the wing. The apparatus further includes a bottom clamshell having a second contoured surface that captures at least a portion of a bottom surface of the wing. The second contoured surface is adhesively coupled to the bottom surface of the wing. The apparatus further includes a fuselage attachment adhesively coupled to a fuselage tube of the AWT by inserting a portion of the fuselage attachment into the fuselage tube. The fuselage attachment supports a portion of a surface of the bottom clamshell between a leading edge and a trailing edge of the wing. The fuselage attachment further includes a first hardpoint rib located at a forward end of the fuselage attachment. The first hardpoint rib receives a first fastener and is coupled to a balance boom of the AWT. The fuselage attachment further includes a second hardpoint rib located at an aft end of the fuselage attachment. The second hardpoint rib receives a second fastener and is coupled to a perch peg of the AWT. The fuselage attachment further includes a third hardpoint rib located between the first and second hardpoint ribs. The third hardpoint rib is coupled to the perch peg of the AWT. The top clamshell is coupled to the fuselage attachment via the first fastener and the second fastener.

These as well as other aspects, advantages, and alternatives, will become apparent to those of ordinary skill in the art by reading the following detailed description, with reference where appropriate to the accompanying figures.

DETAILED DESCRIPTION

Figure 1:
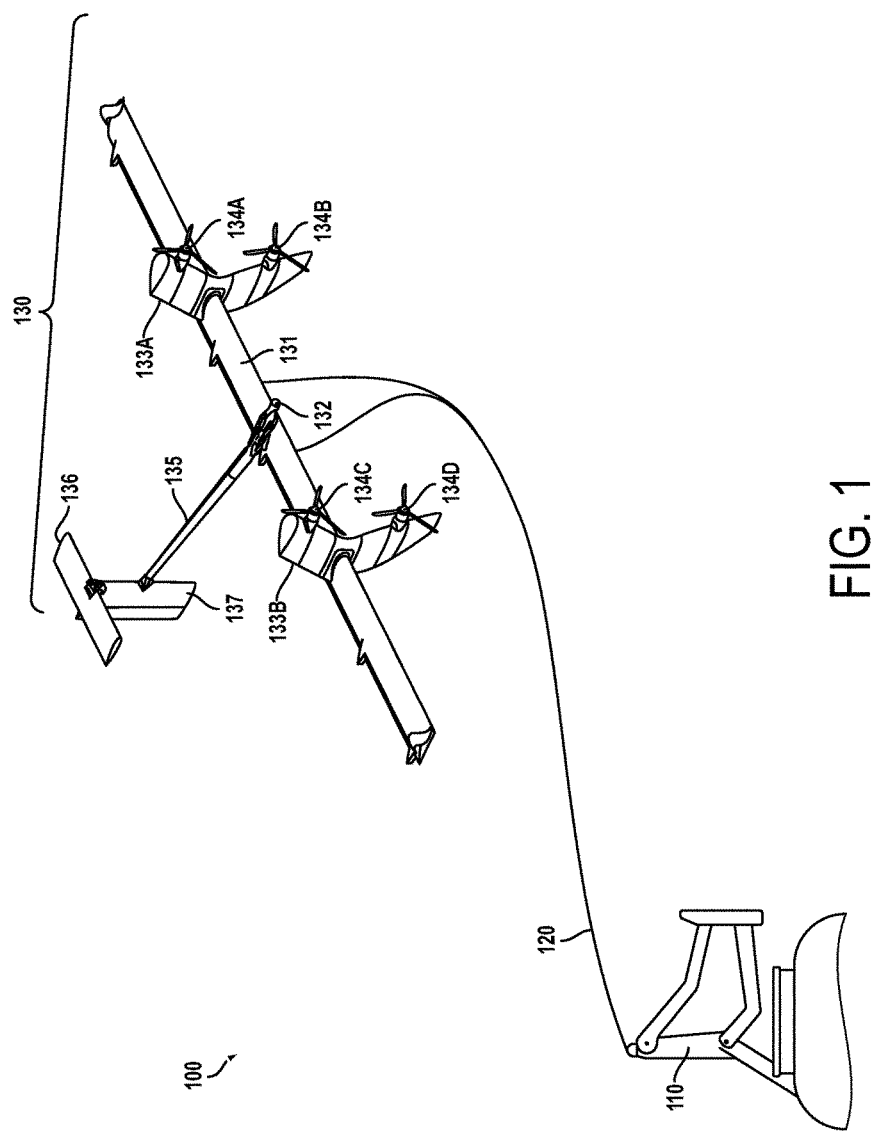
FIG. 1 depicts an airborne wind turbine.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

An airborne wind turbine (AWT) may include an aerial vehicle that flies in a substantially circular path to convert kinetic wind energy to electrical energy. The aerial vehicle may include a wing that resembles a portion of a conventional wind turbine blade and is tethered to a ground station. Once deployed into the air, the wing can be controlled to react to wind similarly to a conventional wind turbine blade in that the wing may make periodic revolutions around a circular path that is substantially perpendicular to a direction of an apparent wind (ie. cross-wind flight). The wing may have one or more dual purpose motor/generators mounted on the wing such that when the wing repeatedly flies along the circular path, a cross-wind perpendicular to the apparent wind may cause the generators to generate electric energy to be transmitted down the tether to the ground station.

Energy may be expended in navigating the aerial vehicle to a position and altitude at which the apparent wind can begin to cause the aerial vehicle to make substantially circular revolutions that cause the dual purpose motor/generators of the AWT to produce energy. To generate energy efficiently, it is desirable to minimize the amount of energy expended to place the aerial vehicle into cross-wind (energy generating) flight. One way to reduce this energy consumption is to reduce the weight of the aerial vehicle so that less energy is needed to put the aerial vehicle in position to begin cross-wind flight. Accordingly, it may be desirable to reduce the structural framework (e.g., pylons, fuselage, and wings) that support the motor/generators. While the aerial vehicle is performing cross-wind flight, the aerial vehicle may continuously make a turn toward a center of a circular path, which may cause the structural framework to experience instances of high strain. However, reinforcing features designed to withstand strain may come at a cost of an increased weight of the wing, causing energy generation efficiency to decrease.

This disclosure provides an attachment apparatus for coupling a fuselage tube of the aerial vehicle (of the AWT) to the wing. The attachment apparatus may include a top clamshell, a bottom clamshell, and a fuselage attachment. The top and bottom clamshells may be contoured to respectively clasp around the top and bottom surfaces of the wing from a leading edge of the wing to a trailing edge of the wing. The attachment apparatus may be coupled to the wing with a fastener near the trailing edge of the wing (and possibly with a fastener near the leading edge of the wing), which, in conjunction with adhesive bonding of the top and bottom clamshells to the top and bottom surfaces of the wing, may distribute strain somewhat uniformly across the top and bottom surfaces of the wing. This may allow wing designs that include smaller and lighter structural elements, making energy generation of the AWT more efficient. Also, the contoured shapes of the top and bottom clamshells may reduce aerodynamic drag, further contributing to the efficiency of energy generation.

Referring now to the figures, FIG. 1 depicts an airborne wind turbine 100, according to an example embodiment. The airborne wind turbine 100 may include a ground station 110, a tether 120, and an aerial vehicle 130. As shown in FIG. 1, the aerial vehicle 130 may be connected to the tether 120, and the tether 120 may be connected to the ground station 110. The tether 120 may be attached to the ground station 110 at one location on the ground station 110, and attached to the aerial vehicle 130 at two locations on the aerial vehicle 130. However, in other examples, the tether 120 may be attached at multiple locations to any part of the ground station 110 or the aerial vehicle 130.

The ground station 110 may be used to hold or support the aerial vehicle 130 until the aerial vehicle 130 is in a flight mode. The ground station 110 may also be configured to reposition the aerial vehicle 130 such that deploying the aerial vehicle 130 is possible. Further, the ground station 110 may be further configured to receive the aerial vehicle 130 during a landing. The ground station 110 may be formed of any material that can suitably keep the aerial vehicle 130 attached or anchored to the ground while in hover flight, forward flight, or crosswind flight.

In addition, the ground station 110 may include one or more components (not shown), such as a winch, that may vary a length of the tether 120. For example, when the aerial vehicle 130 is deployed, the one or more components may be configured to pay out or reel out the tether 120. In some implementations, the one or more components may be configured to pay out or reel out the tether 120 to a predetermined length. As examples, the predetermined length could be equal to or less than a maximum length of the tether 120. Further, when the aerial vehicle 130 lands on the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 to power the aerial vehicle 130 for takeoff, landing, hover flight, or forward flight. The tether 120 may be constructed in any form and using any material which allows for the transmission, delivery, or harnessing of electrical energy generated by the aerial vehicle 130 or transmission of electricity to the aerial vehicle 130. The tether 120 may also be configured to withstand one or more forces of the aerial vehicle 130 when the aerial vehicle 130 is in a flight mode. For example, the tether 120 may include a core configured to withstand one or more forces of the aerial vehicle 130 when the aerial vehicle 130 is in hover flight, forward flight, or crosswind flight. The core may be constructed of high strength fibers. In some examples, the tether 120 may have a fixed length or a variable length.

The aerial vehicle 130 may include various types of devices, such as a kite, a helicopter, a wing, or an airplane, among other possibilities. The aerial vehicle 130 may be formed of solid structures of metal, plastic, polymers, or any material which allows for a high thrust-to-weight ratio and generation of electrical energy which may be used in utility applications. Additionally, the materials may allow for a lightning hardened, redundant or fault tolerant design which may be capable of handling large or sudden shifts in wind speed and wind direction. Other materials may be possible as well.

As shown in FIG. 1, the aerial vehicle 130 may include a main wing 131, a front section 132, pylons 133A-B, actuators 134A-D, a fuselage 135, a tail wing 136, and a vertical stabilizer 137. Any of these components may be shaped in any form which allows for the use of lift to resist gravity or move the aerial vehicle 130 forward.

The main wing 131 may provide a primary lift for the aerial vehicle 130 during forward flight, wherein the aerial vehicle 130 may move through air in a direction substantially parallel to a direction of thrust provided by the actuators 134A-D so that the main wing 131 provides a lift force substantially perpendicular to a ground. The main wing 131 may be one or more rigid or flexible airfoils, and may include various control surfaces or actuators, such as winglets, flaps, rudders, elevators, etc. The control surfaces may be used to steer or stabilize the aerial vehicle 130 or reduce drag on the aerial vehicle 130 during hover flight, forward flight, or crosswind flight. The main wing 131 may be any suitable material for the aerial vehicle 130 to engage in hover flight, forward flight, or crosswind flight. For example, the main wing 131 may include carbon fiber or e-glass. Moreover, the main wing 131 may have a variety dimensions. For example, the main wing 131 may have one or more dimensions that correspond with a conventional wind turbine blade. The front section 132 may include one or more components, such as a nose, to reduce drag on the aerial vehicle 130 during flight.

The pylons 133A-B may connect the actuators 134A-D to the main wing 131. In the example depicted in FIG. 1, the pylons 133A-B are arranged such that the actuators 134A and 134B are located on opposite sides of the main wing 131 and actuators 134C and 134D are also located on opposite sides of the main wing 131. The actuator 134C may also be located on an end of the main wing 131 opposite of the actuator 134A, and the actuator 134D may be located on an end of main wing 131 opposite of the actuator 134B.

In a power generating mode, the actuators 134A-D may be configured to drive one or more generators for the purpose of generating electrical energy. As shown in FIG. 1, the actuators 134A-D may each include one or more blades. The actuator blades may rotate via interactions with the wind and could be used to drive the one or more generators. In addition, the actuators 134A-D may also be configured to provide a thrust to the aerial vehicle 130 during flight. As shown in FIG. 1, the actuators 134A-D may function as one or more propulsion units, such as a propeller. Although the actuators 134A-D are depicted as four actuators in FIG. 1, in other examples the aerial vehicle 130 may include any number of actuators.

In a forward flight mode, the actuators 134A-D may be configured to generate a forward thrust substantially parallel to the fuselage 135. Based on the position of the actuators 134A-D relative to the main wing 131 depicted in FIG. 1, the actuators may be configured to provide a maximum forward thrust for the aerial vehicle 130 when all of the actuators 134A-D are operating at full power. The actuators 134A-D may provide equal or about equal amounts of forward thrusts when the actuators 134A-D are operating at full power, and a net rotational force applied to the aerial vehicle by the actuators 134A-D may be zero.

The fuselage 135 may connect the main wing 131 to the tail wing 136 and the vertical stabilizer 137. The fuselage 135 may have a variety of dimensions. In such implementations, the fuselage 135 may carry a payload.

The tail wing 136 or the vertical stabilizer 137 may be used to steer or stabilize the aerial vehicle 130 or reduce drag on the aerial vehicle 130 during hover flight, forward flight, or crosswind flight. For example, the tail wing 136 or the vertical stabilizer 137 may be used to maintain a pitch or a yaw attitude of the aerial vehicle 130 during hover flight, forward flight, or crosswind flight. In FIG. 1, the vertical stabilizer 137 is attached to the fuselage 135, and the tail wing 136 is located on top of the vertical stabilizer 137. The tail wing 136 may have a variety of dimensions.

While the aerial vehicle 130 has been described above, it should be understood that the methods and systems described herein could involve any aerial vehicle that is connected to a tether, such as the tether 120.

Figure 2:
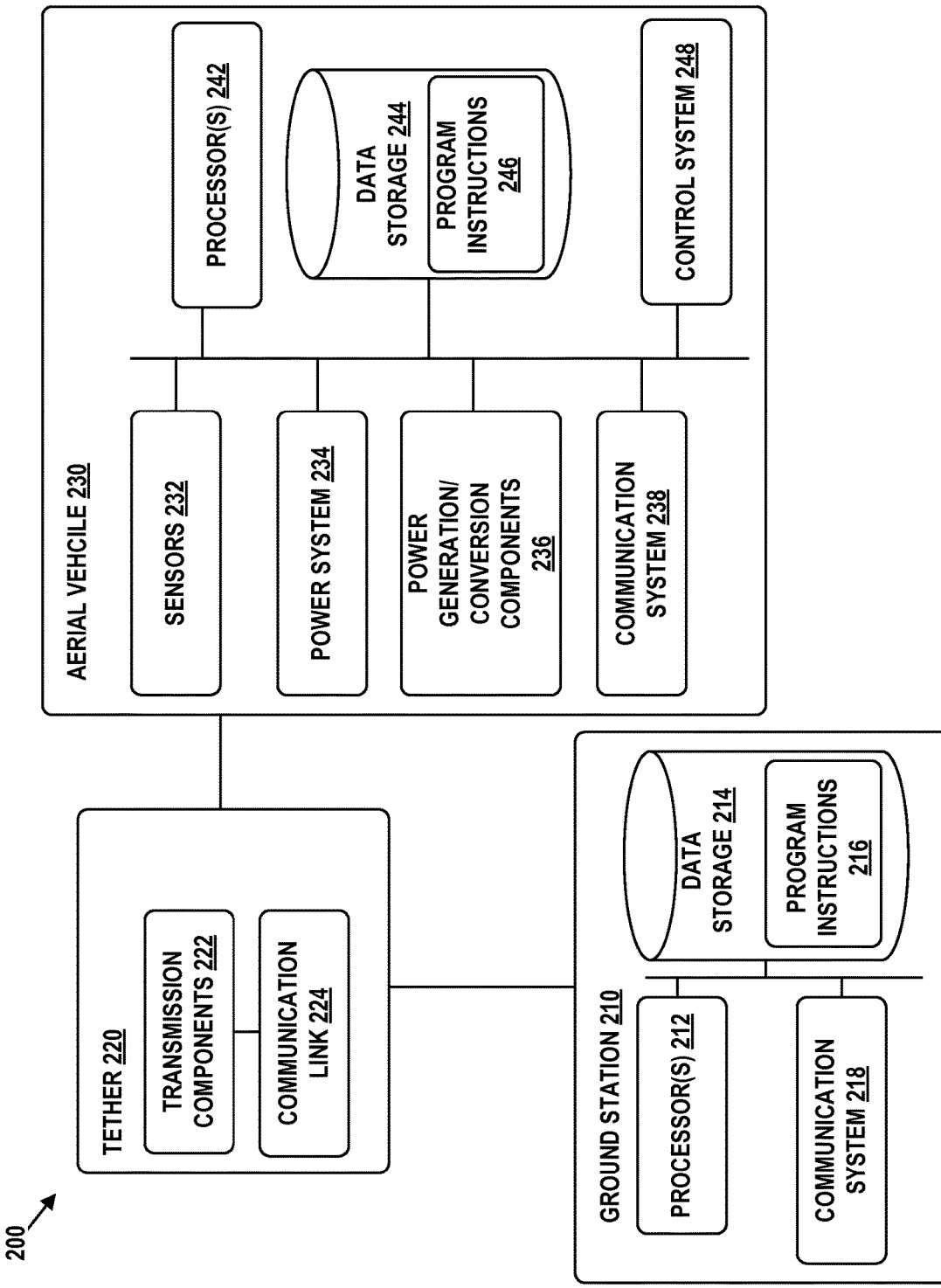
FIG. 2 is a simplified block diagram illustrating example components of the airborne wind turbine.

FIG. 2 is a simplified block diagram illustrating example components of an airborne wind turbine 200. The airborne wind turbine 200 may include the ground station 210, the tether 220, and the aerial vehicle 230. As shown in FIG. 2, the ground station 210 may include one or more processors 212, data storage 214, program instructions 216, and a communication system 218. A processor 212 may be a general-purpose processor or a special purpose processor (e.g., digital signal processors, application specific integrated circuits, etc.). The one or more processors 212 may be configured to execute computer-readable program instructions 216 that are stored in data storage 214 and are executable to provide at least part of the functionality described herein.

The data storage 214 may include or take the form of one or more computer-readable storage media that may be read or accessed by at least one processor 212. The one or more computer-readable storage media can include volatile or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include the communication system 218. The communications system 218 may include one or more wireless interfaces or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WMAX (e.g., an IEEE 802.16 standard), a radio-frequency ID (RFID) protocol, near-field communication (NFC), or other wireless communication protocols. Such wireline interfaces may include an Ethernet interface, a Universal Serial Bus (USB) interface, or a similar interface to communicate via a wire, a twisted pair of wires, a coaxial cable, an optical link, a fiber-optic link, or other physical connection to a wireline network. The ground station 210 may communicate with the aerial vehicle 230, other ground stations, or other entities (e.g., a command center) via the communication system 218.

In an example embodiment, the ground station 210 may include communication systems 218 that allows for both short-range communication and long-range communication. For example, the ground station 210 may be configured for short-range communications using Bluetooth and for long-range communications under a CDMA protocol. In such an embodiment, the ground station 210 may be configured to function as a "hot spot", or as a gateway or proxy between a remote support device (e.g., the tether 220, the aerial vehicle 230, and other ground stations) and one or more data networks, such as a cellular network or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command station, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 or transmit electrical energy from the ground station 210 to the aerial vehicle 230. The transmission components 222 may take various different forms in different embodiments. For example, the transmission components 222 may include one or more conductors that are configured to transmit electricity. And in at least one such example, the one or more conductors may include aluminum or any other material which allows for the conduction of electric current. Moreover, in some implementations, the transmission components 222 may surround a core of the tether 220 (not shown).

The ground station 210 could communicate with the aerial vehicle 230 via the communication link 224. The communication link 224 may be bidirectional and may include one or more wired or wireless interfaces. Also, there could be one or more routers, switches, or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, program instructions 246, and a control system 248.

The sensors 232 could include various different sensors in different embodiments. For example, the sensors 232 may include a global positioning system (GPS) receiver. The GPS receiver may be configured to provide data that is typical of GPS systems (which may be referred to as a global navigation satellite system (GNNS)), such as the GPS coordinates of the aerial vehicle 230. Such GPS data may be utilized by the airborne wind turbine 200 to provide various functions described herein.

As another example, the sensors 232 may include one or more wind sensors, such as one or more pitot tubes. The one or more wind sensors may be configured to detect apparent or relative wind. Such wind data may be utilized by the airborne wind turbine 200 to provide various functions described herein.

Still as another example, the sensors 232 may include an inertial measurement unit (IMU). The IMU may include both an accelerometer and a gyroscope, which may be used together to determine the orientation or attitude of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, errors in measurement may compound over time. However, an example aerial vehicle 230 may be able mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of or prevent drift of the IMU. The aerial vehicle 230 may include a thermometer or another sensor that senses air temperature as well.

As noted, the aerial vehicle 230 may include the power system 234. The power system 234 could take various different forms in different embodiments. For example, the power system 234 may include one or more batteries that provide power to the aerial vehicle 230. In some implementations, the one or more batteries may be rechargeable and each battery may be recharged via a wired connection between the battery and a power supply or via a wireless charging system, such as an inductive charging system that applies an external time-varying magnetic field to an internal battery or a charging system that uses energy collected from one or more solar panels.

As another example, the power system 234 may include one or more motors or engines for providing power to the aerial vehicle 230. In one embodiment, the power system 234 may provide power to the actuators 134A-D of the aerial vehicle 130, as shown and described in FIG. 1. In some implementations, the one or more motors or engines may be powered by a fuel, such as a hydrocarbon-based fuel. In such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 236 could take various different forms in different embodiments. For example, the power generation/conversion components 236 may include one or more generators, such as high-speed, direct-drive generators. The one or more generators may be driven by one or more rotors or actuators, such as the actuators 134A-D as shown and described in FIG. 1.

Moreover, the aerial vehicle 230 may include a communication system 238. The communication system 238 may take the form of or be similar in form to the communication system 218 of the ground station 210. The aerial vehicle 230 may communicate with the ground station 210, other aerial vehicles, or other entities (e.g., a command center) via the communication system 238.

In some implementations, the aerial vehicle 230 may be configured to function as a "hot spot" or as a gateway or proxy between a remote support device (e.g., the ground station 210, the tether 220, other aerial vehicles) and one or more data networks, such as cellular network or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 244, and the data storage 246. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems or with hardware, firmware, or software. As one example, the control system 248 may take the form of program instructions stored on a non-transitory computer readable medium and a processor that executes the instructions. The control system 248 may be implemented in whole or in part on the aerial vehicle 230 or at least one entity remotely located from the aerial vehicle 230, such as the ground station 210. Generally, the manner in which the control system 248 is implemented may vary, depending upon the particular embodiment.

Figure 3:
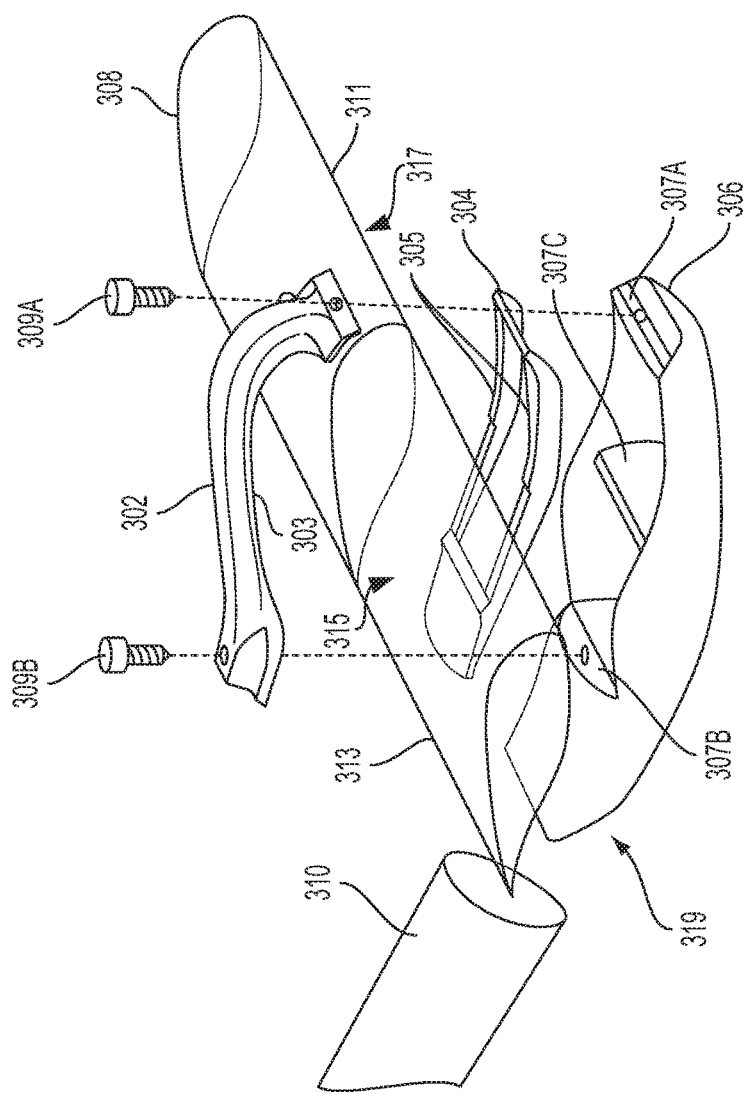
FIG. 3 is an exploded view of an attachment apparatus for an aerial vehicle.

FIG. 3 is an exploded view of an attachment apparatus for an aerial vehicle. FIG. 3 includes a top clamshell 302, a bottom clamshell 304, a fuselage attachment 306, a first hardpoint rib 307A, a second hardpoint rib 307B, a third hardpoint rib 307C, a wing 308, a first fastener 309A, a second fastener 309B, a fuselage tube 310, a leading edge 311 of the wing 308, and a trailing edge 313 of the wing 308. Wing 308 is illustrated as a transparent entity for purposes of illustrative clarity.

The top clamshell 302, preferably constructed with carbon fiber or other lightweight materials, may have a contoured surface 303 that is configured to capture a portion of a top surface 315 of the wing 308. In one example, the contoured surface 303 of the top clamshell 302 makes continuous contact with the top surface 315 of the wing 308. The top surface 315 of the wing 308 may include a portion between the leading edge 311 and the trailing edge 313 along a top side of the wing 308 as shown in FIG. 3. The contoured surface 303 of the top clamshell 302 may be adhesively coupled to the top surface 315 of the wing 308 and configured to restrain the wing 308 between the top clamshell 302 and the bottom clamshell 304. The top clamshell 302 may include one or more holes for receiving fasteners 309A and 309B. The fasteners 309A and 309B may couple the top clamshell 302 to the fuselage attachment 306.

The bottom clamshell 304, preferably constructed with carbon fiber or other lightweight materials, may have a contoured surface 305 that is configured to capture a portion of a bottom surface 317 of the wing 308. The bottom surface 317 of the wing 308 may include a portion between the leading edge 311 and the trailing edge 313 along a bottom side of the wing 308 as shown in FIG. 3. In one example, the contoured surface 305 of the bottom clamshell 304 may be adhesively coupled to the bottom surface 317 of the wing 308 and configured to restrain the wing 308 between the top clamshell 302 and the bottom clamshell 304. In another example (not shown in FIG. 3), the bottom clamshell 304 may include one or more holes for receiving fasteners 309A and 309B. Whether or not the fasteners 309A and 309B pass through holes of the bottom clamshell 304, the fasteners 309A and 309B may function to couple the bottom clamshell 304 to the top clamshell 302 and the fuselage attachment 306 via compression and/or mechanical attachment, and to the wing 308 via compression between the top and bottom clamshells 302 and 304.

The fuselage attachment 306, preferably constructed with carbon fiber or other lightweight materials, may have a contoured surface configured to capture or support a surface or portions of the bottom clamshell 304. An aft end 319 of the fuselage attachment 306 may be configured to be coupled to the fuselage tube 310 by inserting the aft end 319 of the fuselage attachment 306 into the fuselage tube 310 so that the wing 308 may be coupled to the fuselage tube 310 via mechanical, friction, adhesive, or other attachment means. The fuselage tube 310 may alternatively or additionally couple the wing 308 to other aerodynamic surfaces of the aerial vehicle, such as a vertical stabilizer or a rudder, for example.

The fuselage attachment 306 may include one or more of a first hardpoint rib 307A, a second hardpoint rib 307B, and a third hardpoint rib 307C. The first hardpoint rib 307A and/or the second hardpoint rib 307B may include receivers (e.g., barrel nuts, thread inserts, etc.) configured to respectively receive the fasteners 309A and 309B (e.g., bolts) to couple or clasp the fuselage attachment 306 to the bottom clamshell 304, the wing 308, and the top clamshell 302. The hardpoint ribs 307A-C may have a plate-like structure like a shear wall and provide structural support to the fuselage attachment 306. The hardpoint ribs 307A-C could be contiguous portions of the fuselage attachment 306, or alternatively, could be inserted into receiving slots of the fuselage attachment 306. Other configurations of the hardpoint ribs 307A-C are also contemplated.

The wing 308 may be a wing of an aerial vehicle of an airborne wind turbine (AWT). The wing 308 may include internal structures that provide support to the wing 308 so that the wing 308 may provide lift for the aerial vehicle. A top exterior surface 315 of the wing 308 may be adhesively coupled to the top clamshell 302 and a bottom exterior surface 317 of the wing 308 may be adhesively coupled to the bottom clamshell 304.

The fasteners 309A and 309B may be threaded bolts configured to be respectively received by the hardpoint ribs 307A and 307B of the fuselage attachment 306. The fastener 309A may couple the fuselage attachment 306 to the top clamshell 302 at a forward end of the attachment apparatus and the fastener 309B may couple the fuselage attachment 306 to the top clamshell 302 at an aft end of the attachment apparatus. In this way, the fasteners 309A and 309B may apply a clamping force that holds together the top clamshell 302, the bottom clamshell 304, the wing 308, and the fuselage attachment 306. Other fastening connections between the fasteners 309A and 309B and the hardpoint ribs 307A and 307B of the fuselage attachment 306 are possible.

Figure 4A:
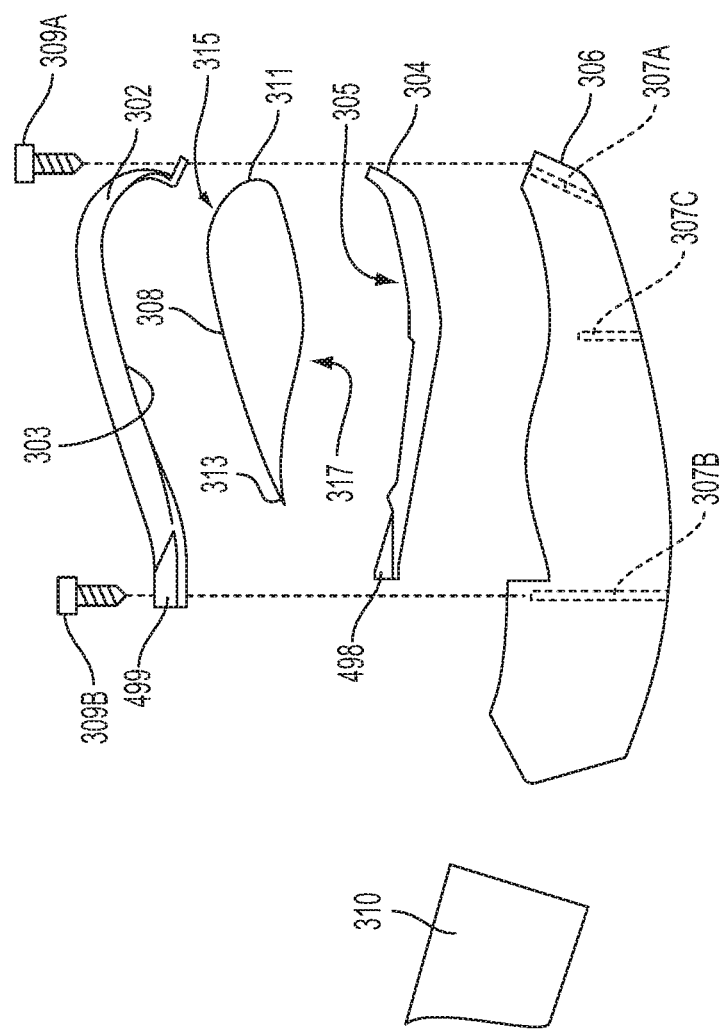
FIG. 4A is a side exploded view of an attachment apparatus for an aerial vehicle.

FIG. 4A is an exploded side view of an attachment apparatus for an aerial vehicle. FIG. 4A includes a top clamshell 302 including contoured surface 303, a bottom clamshell 304 including a contoured surface 305, a fuselage attachment 306, a wing 308, fasteners 309A and 309B, a fuselage tube 310, a leading edge 311 of the wing 308, and a trailing edge 313 of the wing 308.

As shown in FIG. 4A, the top clamshell 302 and the bottom clamshell 304 may have interior contoured surfaces 303 and 305 configured to be respectively adhesively coupled to the top surface 315 of the wing 308 and the bottom surface 317 of the wing 308. FIG. 4A depicts the top clamshell 302 and the bottom clamshell 304 as coming together near the leading edge 311 and near the trailing edge 313. In some examples the top clamshell 302 and the bottom clamshell 304 could contact the wing 308 at a variety of locations of the wing 308 and could come together fore and/or aft of the wing 308. In some examples, top clamshell 302 may or may not contact bottom clamshell 304. Preferably, any direct attachments between (i) the wing 308 and the top clamshell 302 and (ii) the wing 308 and the bottom clamshell 304 may be adhesive, which may spread strain loads caused by flight of the aerial vehicle relatively evenly across the top surface 315 and the bottom surface 317 of the wing 308. That is, the contoured surface 303 of the top clamshell 302 and the contoured surface 305 of the bottom clamshell 304 may be respectively useful in distributing loads (e.g., shear loads) across the top surface 315 and the bottom surface 317 of the wing 308.

Further, the bottom clamshell 304 may include an additional contoured surface 498 and the top clamshell 302 may include an additional contoured surface 499. As shown in FIG. 4A, the contoured surface 499 may be configured to receive the contoured surface 498 such that load(s) (e.g., a shear load) induced by the fastener 309B may be distributed across an interface formed by the contoured surface 498 and the contoured surface 499.

Although not shown in FIG. 4A, in another examples the top clamshell 302 may include an additional contoured surface (e.g., a "male" surface similar to contoured surface 498). The bottom clamshell 304 may include an additional contoured surface (e.g., a "female" surface similar to the contoured surface 499). The additional contoured surface of the bottom clamshell 304 may be configured to receive the additional contoured surface of the top clamshell 302 to form an interface for distributing a fastener-induced load.

Also, in some examples the fuselage attachment 306 may include an additional contoured surface (e.g., similar to the contoured surface 498), such that an additional contoured surface (e.g., similar to contoured surface 499) of the top clamshell 302 may receive the additional contoured surface of the fuselage attachment 306. Alternatively, the fuselage attachment 306 may include an additional contoured surface (e.g., similar to contoured surface 499) that receives an additional contoured surface (e.g., similar to the contoured surface 498) of the top clamshell 302. This may result in an interface that distributes a fastener-induced load.

Generally, any structures described herein as attached to each other may include respective contoured surfaces (e.g., respectively similar to contoured surface 499 and contoured surface 498) that form an interface that distributes or spreads load(s) (e.g., shear load induced by a fastener) across the interface.

Figure 4B:
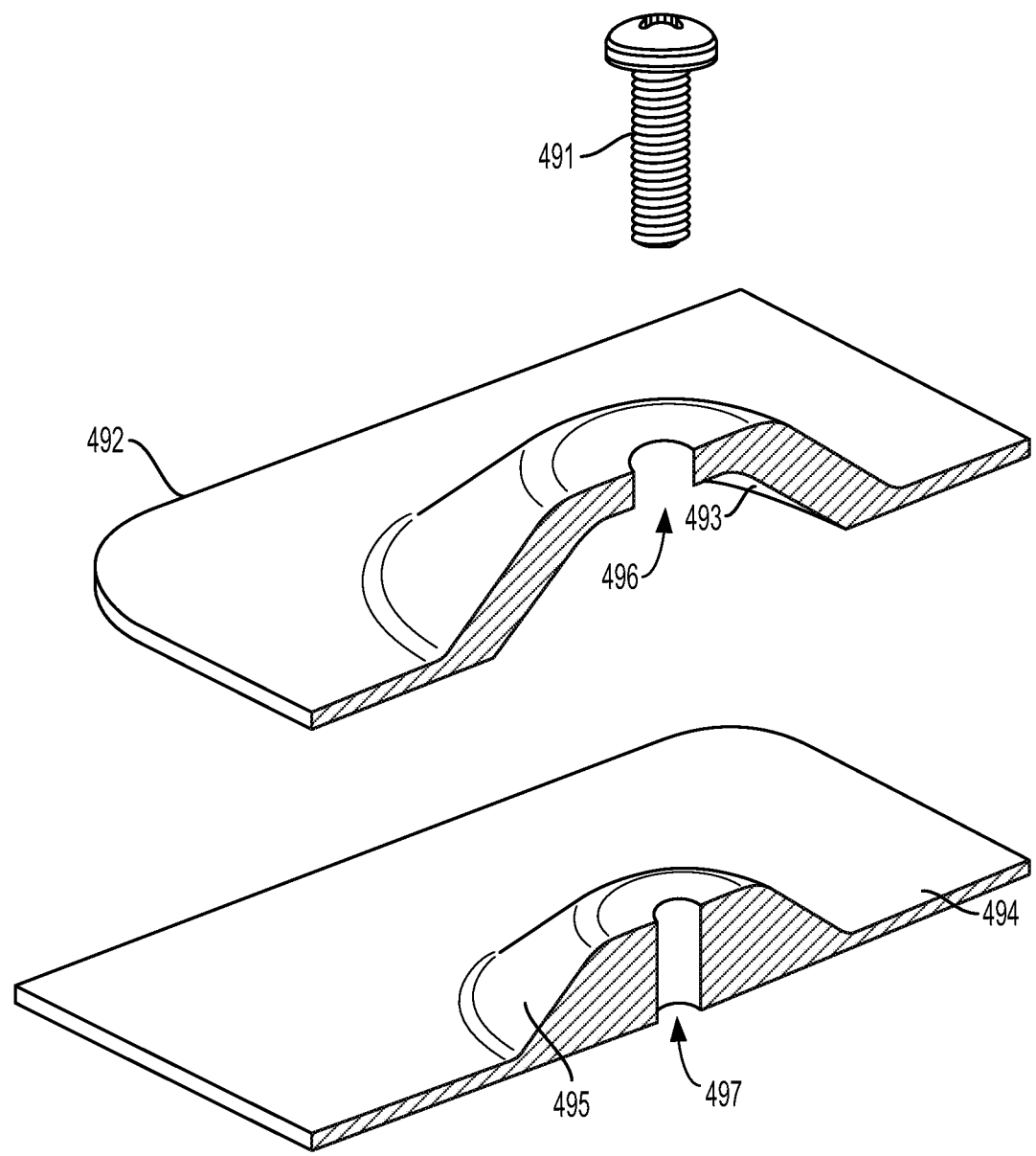
FIG. 4B is a cross section of example contoured surfaces.

FIG. 4B illustrates further examples of contoured surfaces. FIG. 4B depicts a fastener 491, a first structure 492 with a contoured surface 493 and a hole 496, and a second structure 494 with a contoured surface 495 and a hole 497. In a first example, the first structure 492 may be a portion of the top clamshell 302 and the second structure 494 may be a portion of the fuselage attachment 306. In a second example, the first structure 492 may be a portion of the top clamshell 302 and the second structure 494 may be a portion of the bottom clamshell 304. Generally, any structures described herein as attached to each other may include respective contoured surfaces similar to contoured surfaces 493 and 495.

The contoured surface 493 of the first structure 492 may be configured to receive or sit over the contoured surface 495 of the second structure 494, thereby forming an interface such that a load (e.g., a load induced by the fastener 491 inserted through the holes 496 and 497) is distributed over the interface. The fastener 491 may be inserted through the holes 496 and 497 to couple the first structure 492 and the second structure 494.

Figure 4C:
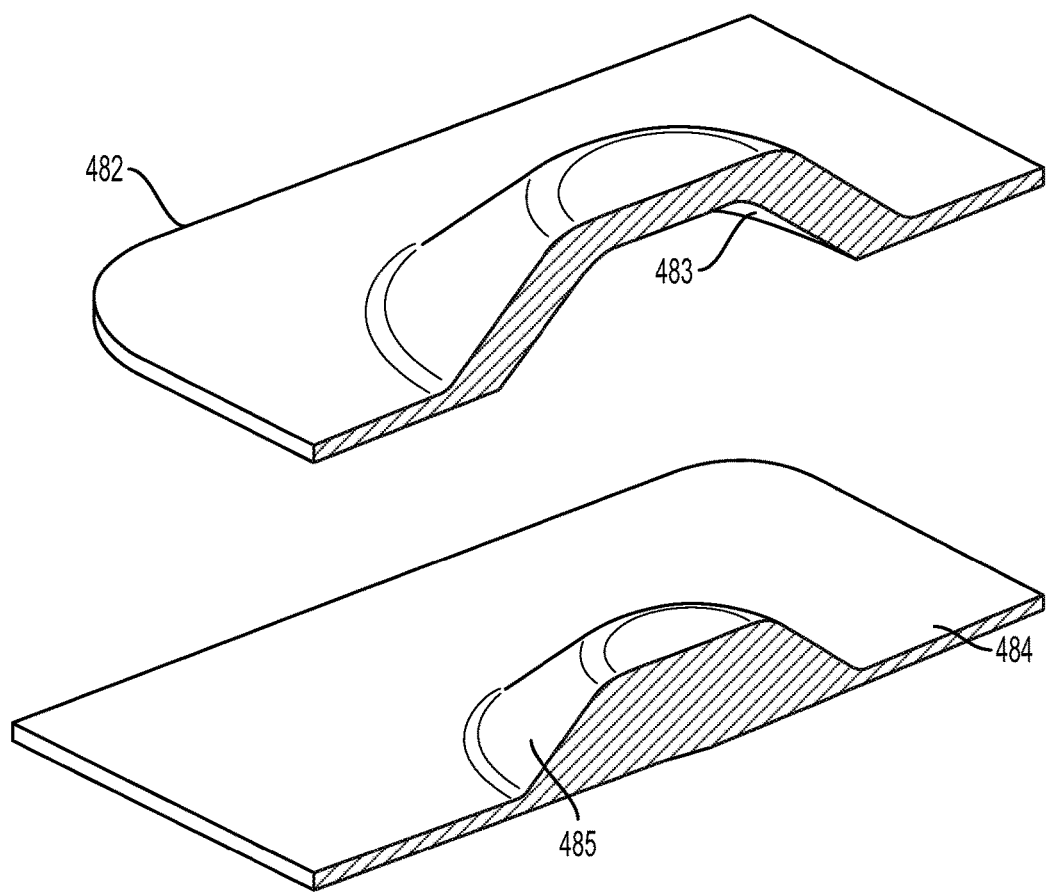
FIG. 4C is a cross section of other example contoured surfaces.

FIG. 4C illustrates further examples of contoured surfaces. FIG. 4C depicts a first structure 482 with a contoured surface 483, and a second structure 484 with a contoured surface 485. The contoured surfaces 483 and 485 may be similar to respective contoured surfaces 493 and 495 of FIG. 4B, however the contoured surfaces 483 and 485 might not include holes such as holes 496 and 497. That is, in a situation where the first structure 482 and the second structure 484 are not coupled via a fastener, the contoured surfaces 483 and 485 may still be useful in forming an interface that couples the first structure 482 and the second structure 484 and distributes, over the interface, load(s) exerted upon the first structure 482 and/or the second structure 484.

In a first example, the first structure 482 may be a portion of the top clamshell 302 and the second structure 484 may be a portion of the fuselage attachment 306. In a second example, the first structure 482 may be a portion of the top clamshell 302 and the second structure 484 may be a portion of the bottom clamshell 304. Generally, any structures described herein as attached to each other may include respective contoured surfaces similar to contoured surfaces 483 and 485.

Figure 4D:
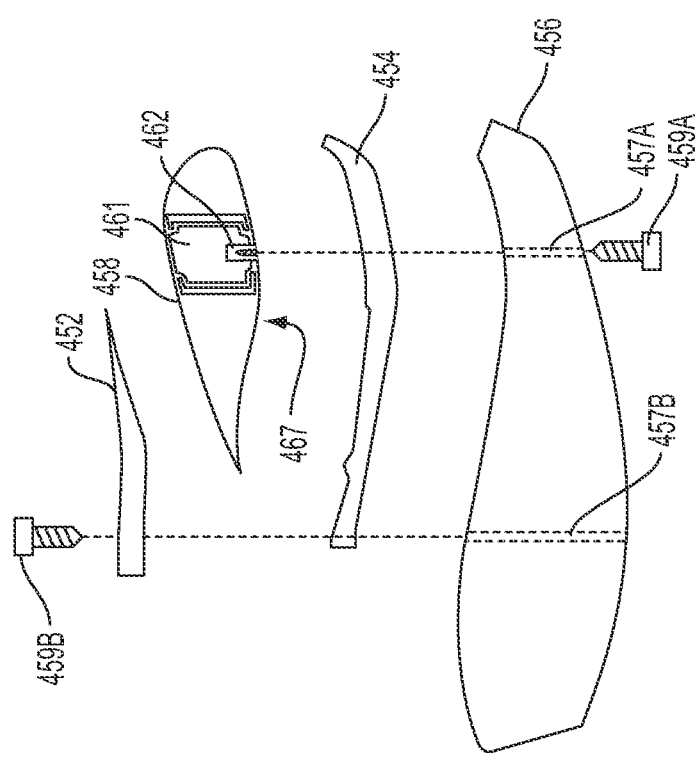
FIG. 4D is a side exploded view of another attachment apparatus for an aerial vehicle.

FIG. 4D illustrates another example of an attachment apparatus. FIG. 4D depicts top clamshell 452, bottom clamshell 454, fuselage attachment 456, hardpoint ribs 457A and 457B, wing 458, fasteners 459A and 459B, reinforced connecting rib 461, and receiver 462.

The top clamshell 452 may be coupled to the bottom clamshell 454 and/or the fuselage attachment 456 via the fastener 459B, which may be inserted through the top clamshell 452, and into the hardpoint rib 457B of the fuselage attachment 456. The wing 458 may be coupled to the fuselage attachment 456 via the fastener 459A, which may be inserted through the hardpoint rib 457A, through the bottom surface 467 of the wing 458, and into a receiver 462 of the reinforced connecting rib 461 of the wing 458. The reinforced connecting rib 461 may be a structural support member of the wing 458 located within an interior cavity of the wing 458. For example, reinforced connecting rib 461 may be include a plate-like structure that is coupled to one or more shear walls that span some length of the wing 458.

Figure 5:
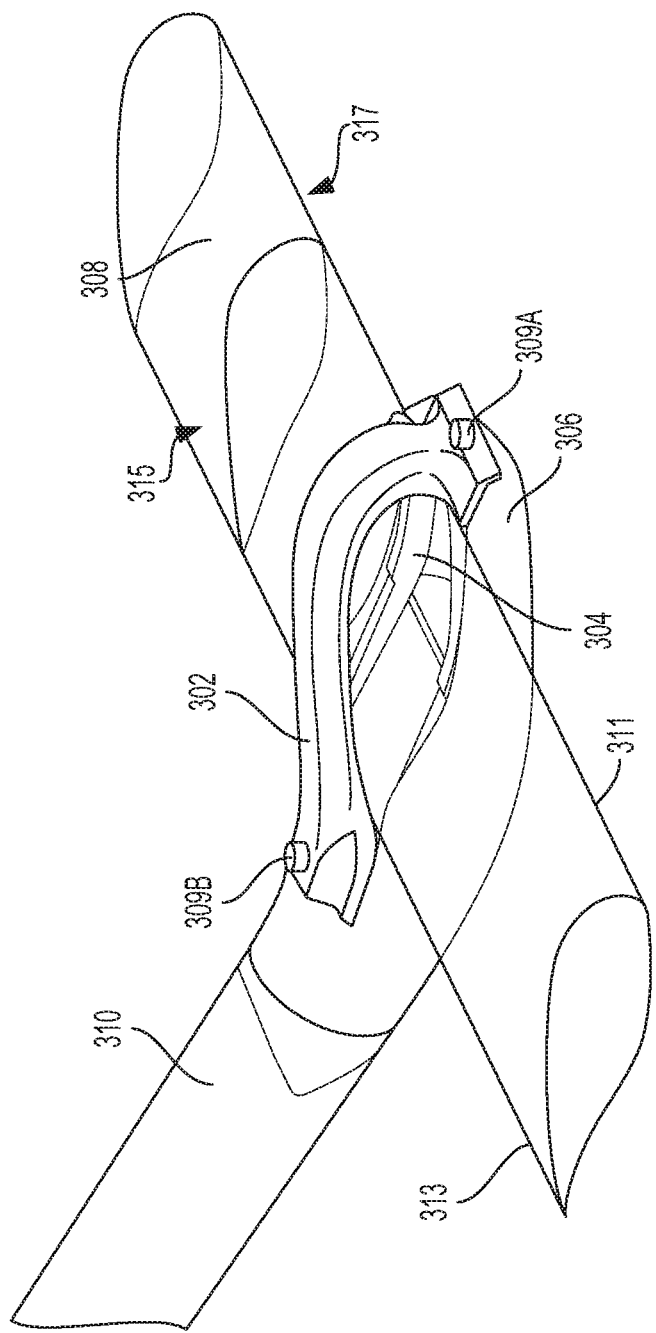
FIG. 5 is an assembled view of an attachment apparatus for an aerial vehicle.

FIG. 5 is an assembled view of an attachment apparatus for an aerial vehicle. FIG. 5 includes a top clamshell 302, a bottom clamshell 304, a fuselage attachment 306, a wing 308, a first fastener 309A, a second fastener 309B, a leading edge 311 of the wing 308, a trailing edge 313 of the wing 308, a top exterior surface 315 of the wing 308, and a bottom exterior surface 317 of the wing 308. Wing 308 is illustrated as a transparent entity for purposes of illustrative clarity. As shown, the wing 308 may be restrained between the top clamshell 302 and a bottom clamshell 304, and the fuselage attachment 306 may be inserted into, and adhesively coupled to, the fuselage tube 310. Mechanical, friction, or other attachment means are possible as well.

Figure 6A:
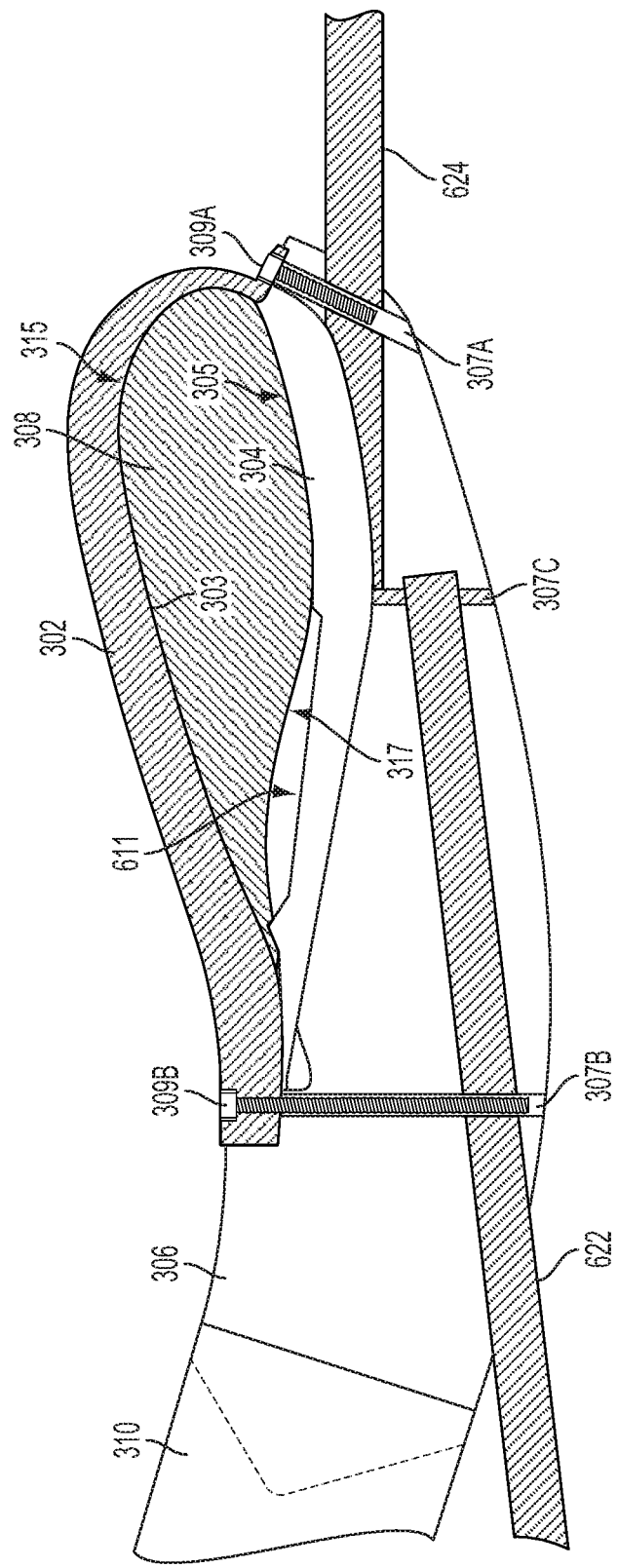
FIG. 6A is a side cross section of an attachment apparatus for an aerial vehicle.

FIG. 6A is a side view cross section of an attachment apparatus for an aerial vehicle. FIG. 6A includes a top clamshell 302 including a contoured surface 303, a bottom clamshell 304 including a contoured surface 305, a fuselage attachment 306, a first hardpoint rib 307A, a second hardpoint rib 307B, a third hardpoint rib 307C, a wing 308, a first fastener 309A, a second fastener 309B, a fuselage tube 310, a portion 611 of the bottom clamshell 304, a top exterior surface 315 of the wing 308, a bottom exterior surface 317 of the wing 308, a perch peg 622, and a balance boom 624.

The attachment apparatus depicted in FIG. 6A may be similar to examples discussed above, however the attachment apparatus depicted in FIG. 6A may further be coupled to the perch peg 622 and the balance boom 624.

The first fastener 309A may be inserted into a receiver of the first hardpoint rib 307A. The first hardpoint rib 307A may include a threaded portion that receives the fastener 309A. In addition or in the alternative, the balance boom 624 may include a threaded receiver (e.g. threaded insert, barrel nut, etc.) that receives the first fastener 309A.

The second fastener 309B may be inserted into a receiver of the second hardpoint rib 307B. The second hardpoint rib 307B may include a threaded portion that receives the fastener 309B. In addition or in the alternative, the perch peg 622 may include a threaded receiver (e.g. threaded insert, barrel nut, etc.) that receives the second fastener 309B.

The portion 611 of the bottom clamshell 304 might not be in contact with the wing 308, but in other examples substantially all of the contoured surface 305 of the bottom clamshell 304 may be in contact with the wing 308.

The perch peg 622 may be configured to couple to a ground station so that the aerial vehicle may be secured to the ground station while the aerial vehicle is not in use. The perch peg 622 may be inserted into the fuselage attachment 306 and coupled to the hardpoint ribs 307B and 307C. For example, the hardpoint ribs 307B and 307C may each include two or more pieces that snap together around a portion of the perch peg 622 to hold the perch peg 622 in place relative to the fuselage attachment 306. The hardpoint ribs 307B and 307C may also be adhesively coupled to the perch peg 622. Or, as described above, the perch peg 622 could also include an internal receiver (e.g. a barrel nut) configured to couple to the fastener 309B in line with the hardpoint rib 307B.

The balance boom 624 may be coupled to the aerial vehicle to alter a center of mass of the aerial vehicle, for aerodynamic or other purposes. The balance boom 624 may be inserted into the fuselage attachment 306 and be coupled to one or both of the hardpoint ribs 307A and 307C. The hardpoint ribs 307A and 307C may each include two or more pieces that snap together around a portion of the balance boom 624 to hold the balance boom 624 in place relative to the fuselage attachment 306. The hardpoint ribs 307A and 307C may also be adhesively coupled to the balance boom 624. Or, as described above, the balance boom 624 could include an internal receiver (e.g. a barrel nut) configured to couple to the fastener 309A in line with the hardpoint rib 307A.

Figure 6B:
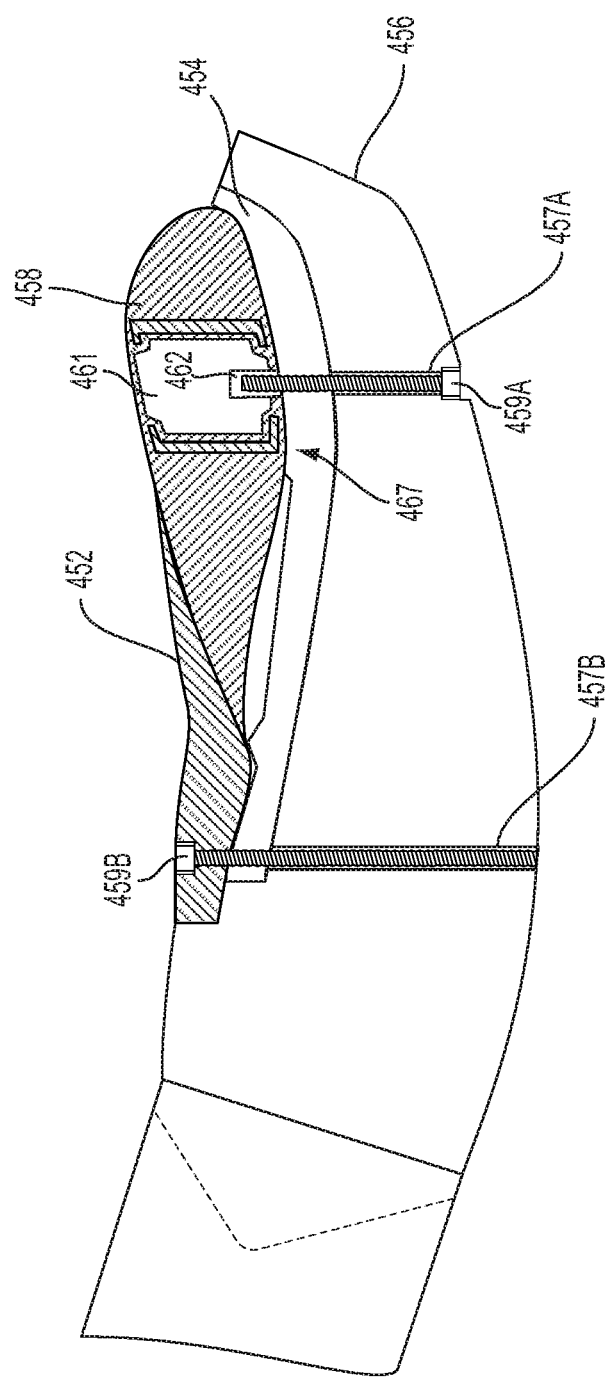
FIG. 6B is a side cross section of another attachment apparatus for an aerial vehicle.

FIG. 6B illustrates another example of an attachment apparatus. FIG. 6B includes a top clamshell 452, a bottom clamshell 454, a fuselage attachment 456, a first hardpoint rib 457B, a second hardpoint rib 457A, a wing 458, a first fastener 59B, a second fastener 459A, a reinforced connecting rib 461, a receiver 462, and a bottom surface 467 of the wing 458. (A balance boom and a perch peg respectively similar to balance boom 624 and perch peg 622 of FIG. 6A may be omitted in FIG. 6B for ease of illustration.)

Unlike the top clamshell 302 of FIG. 6A, which extends to the leading edge of the wing 308, the top clamshell 452 of FIG. 6B does not extend to the leading edge of the wing 458. The top clamshell 452 may be coupled to the bottom clamshell 454 and/or the fuselage attachment 456 via the fastener 459B, which may be inserted through the top clamshell 452, and into the hardpoint rib 457B of the fuselage attachment 456. The wing 458 may be coupled to the fuselage attachment 456 via the fastener 459A, which may be inserted through the hardpoint rib 457A, through the bottom surface 467 of the wing 458, and into a receiver 462 of the reinforced connecting rib 461 of the wing 458. The reinforced connecting rib 461 may be a structural support member of the wing 458 located within an interior cavity of the wing 458. For example, the reinforced connecting rib 461 may include a plate-like structure that is coupled to one or more shear walls that span some length of the wing 458.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. An attachment apparatus comprising:
   a top clamshell having a first contoured surface that is configured to capture at least a portion of a top surface of a wing of an airborne wind turbine (AWT);
   a bottom clamshell having a second contoured surface that is configured to capture at least a portion of a bottom surface of the wing, wherein the first contoured surface and the second contoured surface are configured to restrain the wing between the top clamshell and the bottom clamshell; and
   a fuselage attachment configured to be coupled to the top clamshell via a fastener at an aft end of the attachment apparatus.

2. The attachment apparatus of claim 1, wherein the first contoured surface is adhesively coupled to the top surface of the wing.

3. The attachment apparatus of claim 1, wherein the second contoured surface is adhesively coupled to the bottom surface of the wing.

4. The attachment apparatus of claim 1, wherein the fuselage attachment is configured to capture a portion of a surface of the bottom clamshell.

5. The attachment apparatus of claim 1, wherein the fuselage attachment comprises a hardpoint rib configured to receive the fastener.

6. The attachment apparatus of claim 1, wherein the fuselage attachment comprises a hardpoint rib configured to be coupled to a perch peg of the AWT.

7. The attachment apparatus of claim 6, wherein the perch peg is configured to receive the fastener.

8. The attachment apparatus of claim 1, wherein the fastener is a first fastener, and wherein the top clamshell is further configured to be coupled to the fuselage attachment via a second fastener at a forward end of the attachment apparatus.

9. The attachment apparatus of claim 8, wherein the first fastener and the second fastener are respectively configured to apply clamping forces that hold together the top clamshell, the bottom clamshell, the wing, and the fuselage attachment.

10. The attachment apparatus of claim 8, wherein the fuselage attachment comprises a hardpoint rib configured to receive the second fastener.

11. The attachment apparatus of claim 8, wherein the fuselage attachment comprises a hardpoint rib configured to be coupled to a balance boom of the AWT.

12. The attachment apparatus of claim 11, wherein the balance boom is configured to receive the second fastener.

13. The attachment apparatus of claim 1, wherein the fastener is a first fastener, and wherein the fuselage attachment is configured to be coupled to a reinforced connecting rib of the wing via a second fastener.

14. The attachment apparatus of claim 13, wherein the fuselage attachment comprises a hardpoint rib configured to receive the second fastener.

15. The attachment apparatus of claim 13, wherein the second fastener is configured to be inserted through the bottom surface of the wing to couple the fuselage attachment to the reinforced connecting rib.

16. The attachment apparatus of claim 1, wherein the top clamshell comprises a third contoured surface and the bottom clamshell comprises a fourth contoured surface, and wherein the third contoured surface and the fourth contoured surface are configured to form an interface that distributes a load over the interface.

17. The attachment apparatus of claim 1, wherein the top clamshell comprises a third contoured surface and the fuselage attachment comprises a fourth contoured surface, and wherein the third contoured surface and the fourth contoured surface are configured to form an interface that distributes a load over the interface.

18. An airborne wind turbine (AWT) comprising:
 a ground station;
 a tether; and
 an aerial vehicle, wherein the aerial vehicle is configured to be coupled to the ground station via the tether, wherein the aerial vehicle includes an attachment apparatus further comprising:
  a top clamshell having a first contoured surface that is configured to capture at least a portion of a top surface of a wing of the aerial vehicle;
  a bottom clamshell having a second contoured surface that is configured to capture at least a portion of a bottom surface of the wing, wherein the first contoured surface and the second contoured surface are configured to restrain the wing between the top clamshell and the bottom clamshell; and
  a fuselage attachment configured to be coupled to the top clamshell via a fastener at an aft end of the attachment apparatus.

19. The AWT of claim 18, wherein the fastener is a first fastener, and wherein the top clamshell is further configured to be coupled to the fuselage attachment via a second fastener at a forward end of the attachment apparatus.

20. An attachment apparatus comprising:
 a top clamshell having a first contoured surface that captures at least a portion of a top surface of a wing of an airborne wind turbine (AWT), wherein the first contoured surface is adhesively coupled to the top surface of the wing;
 a bottom clamshell having a second contoured surface that captures at least a portion of a bottom surface of the wing, wherein the second contoured surface is adhesively coupled to the bottom surface of the wing; and
 a fuselage attachment adhesively coupled to a fuselage tube of the AWT by inserting a portion of the fuselage attachment into the fuselage tube, wherein the fuselage attachment supports a portion of a surface of the bottom clamshell between a leading edge and a trailing edge of the wing, and wherein the fuselage attachment further comprises:
  a first hardpoint rib located at a forward end of the fuselage attachment, wherein the first hardpoint rib receives a first fastener and is coupled to a balance boom of the AWT;
  a second hardpoint rib located at an aft end of the fuselage attachment, wherein the second hardpoint rib receives a second fastener and is coupled to a perch peg of the AWT; and
  a third hardpoint rib located between the first and second hardpoint ribs, wherein the third hardpoint rib is coupled to the perch peg of the AWT;
 wherein the top clamshell is coupled to the fuselage attachment via the first fastener and the second fastener.

* * * * *